(12) United States Patent
Heller et al.

(10) Patent No.: US 11,102,978 B2
(45) Date of Patent: Aug. 31, 2021

(54) HERBICIDE COMBINATION

(71) Applicant: UPL EUROPE LTD., Cheshire (GB)

(72) Inventors: Jean-Jacques Heller, Courbevoie (FR); Stansfield Vaughn, Cheshire (GB); Alexander Cornelis Van Der Laan, Vondelingenplaat/RT (NL); Jaidev Rajnikant, Dubai (AE); Vikram Rajnikant Shroff, Dubai (AE)

(73) Assignee: UPL LIMITED EUROPE, Chesire (GB)

( * ) Notice: Subject to any disclaimer, the term of this patent is extended or adjusted under 35 U.S.C. 154(b) by 45 days.

(21) Appl. No.: 15/998,648

(22) PCT Filed: Feb. 14, 2017

(86) PCT No.: PCT/EP2017/053233
§ 371 (c)(1),
(2) Date: Aug. 16, 2018

(87) PCT Pub. No.: WO2017/140650
PCT Pub. Date: Aug. 24, 2017

(65) Prior Publication Data
US 2020/0329708 A1    Oct. 22, 2020

(30) Foreign Application Priority Data
Feb. 16, 2016   (EP) .................................. 16155821

(51) Int. Cl.
*A01N 43/40* (2006.01)
*A01N 43/58* (2006.01)
*A01N 43/66* (2006.01)
*A01N 37/38* (2006.01)

(52) U.S. Cl.
CPC ............ *A01N 43/58* (2013.01); *A01N 37/38* (2013.01); *A01N 43/40* (2013.01); *A01N 43/66* (2013.01)

(58) Field of Classification Search
None
See application file for complete search history.

(56) References Cited

U.S. PATENT DOCUMENTS

| 5,017,215 A | 5/1991 | Ackerson et al. |
| 2007/0232492 A1 | 10/2007 | Kikugawa et al. |
| 2013/0324401 A1* | 12/2013 | Spesard ................ A01N 47/34 504/100 |

FOREIGN PATENT DOCUMENTS

| CN | 1402978 A | 3/2003 |
| EP | 0377642 | 2/1989 |
| EP | 2 848 126 | 3/2015 |
| WO | WO 03/073855 | 9/2003 |
| WO | WO 2009/152827 | 12/2009 |
| WO | WO 2015/018812 | 2/2015 |

OTHER PUBLICATIONS

Zheng, P., et al: Separation and determination of metsulfuron, bensulfuron, acetochlor by high performance liquid chromatography, Jan. 1, 1997. Retrieved from http://www.ncbi.nlm.gov/pubmed/15739345.
International Search Report issued in international patent application No. PCT/EP2017/053233 dated Mar. 17, 2017.
Decision to Grant dated Jun. 27, 2019 and Intent to Grant, along with the Granted Claims, dated Feb. 22, 2019 by EPO.
Communications dated Feb. 21, 2018, Jul. 11, 2018, Nov. 27, 2018, and Feb. 1, 2019 from the EPO Examining Division.
First substantive communication, dated Jul. 12, 2017, from the EPO Examining Division.
European search Opinion and European search report dated Mar. 31, 2016.

* cited by examiner

*Primary Examiner* — Alton N Pryor
(74) *Attorney, Agent, or Firm* — IP Pundit LLC

(57) ABSTRACT

Combinations comprising sulfonylureas and an additional herbicide are disclosed, along with compositions and methods utilizing thereof.

7 Claims, No Drawings

HERBICIDE COMBINATION

FIELD OF THE INVENTION

The present invention relates to compositions comprising bensulfuron and its derivatives, metsulfuron and its derivatives and a third herbicide, especially for selective control of dicotyledonous weeds.

BACKGROUND AND PRIOR ART

Many herbicides are known in the art. Each herbicide has its own weed control spectrum and may or may not control weeds outside its spectrum. Furthermore, the various known herbicides are not completely effective on their own towards the control of various weeds.

The herbicidal effectiveness of a compound cannot be predicted from an examination of the substituent groups of the compound and often quite closely related compounds possess different weed control abilities. Various herbicides of the same class of compounds may have complementary areas of activity and thus can be useful to control a variety of weeds upon application of a combination. Furthermore, the various herbicides are not completely effective so as to control all the infesting weeds in a field crop, which necessitates the use of herbicidal combinations. An ideal herbicide should afford selective weed control, over the full growing season, with a single administration. It should be able to control all common weeds by controlling their growth and reproduction as the seed, the germinating seed, the seedling and the growing plant. It is often imperative to use herbicidal combinations to achieve these advantages, although the selection of the components of an ideal combination is not a straightforward choice for a skilled artisan.

Weed resistance is one of the biggest problems in modern agriculture. Over use of the same herbicides which attack the same systems in weeds has led to the increased weed resistance and increased dosage of herbicide to kill the weeds. Therefore, herbicides of alternate modes of action are used in combination. When applied together or one after another, weed resistance has been found to decrease. This practise is now an important part of the overall weed-control plan. The advantages of such a plan are that herbicide use rates have decreased considerably and, at the same time, the spectrum of weed control has increased. There are also less pollutants in the form of other harmful additives that used to regularly pollute the environment.

The simultaneous or sequential application of two or more herbicides often times result in an unfavourable interaction, such as altering the selectivity or decreasing the efficacy of the herbicide and in extreme circumstances total loss of crop. Herbicide interactions can be categorized as additive, synergistic or antagonistic. The interactions are said to be synergistic when the combined herbicide demonstrate an enhancement of their biological activity which is beyond the scope of their expected activity. An herbicidal combination is said to be antagonistic when the overall effect decreases the biological activity. In some cases it may result in a toxic action.

These problems are further compounded by the widely differing sensitivities of crop plants against herbicidal chemicals. The respression of one weed species may also cause increased growth of another competing species, and that some weeds tend to become resistant against previously effective herbicides.

Antagonistic herbicidal combinations can increase weed-crop competition. Another danger is the unchecked growth of weeds in periods of adverse weather or soil conditions resulting in less than normal crop yields and crop quality and enhanced production and harvest costs.

Sulfonylurea herbicides are known in the art. Examples of such sulfonylurea herbicide include rimsulfuron, metsulfuron, metsulfuron methyl, bensulfuron methyl, ethametsulfuron, nicosulfuron, triasulfuron, primisulfuron, bensulfuron, chlorimuron, chlorimuron-ethyl, chlorsulfuron, sulfometuron, thifensulfuron, tribenuron, triflusuluron, clopyrasulfuron and pyrazosulfuron.

GB2088362 (A) teaches bensulfuron methyl which is commonly known to be used on rice fields. U.S. Pat. No 4,591,378 (A) teaches metsulfuron methyl which is commonly known to be used on crops such as wheat and barley.

EP0377642 (B1) teaches a combination of herbicides metsulfuron methyl and bensulfuron methyl in a granular formulation for the control of weeds in rice fields. There is a need in the art for enhanced uses of this combination and for improved methods of herbicidal control by using this combination.

SUMMARY OF THE INVENTION

In one aspect, the present invention provides a herbicidal combination comprising at least two sulfonylurea herbicides in combination with a third herbicide.

In one aspect, the present invention may provide a combination comprising bensulfuron and its derivatives, metsulfuron and its derivatives and at least a third herbicide.

In another aspect, the present invention may provide a method of controlling weeds at a locus by treating the locus with a combination comprising bensulfuron and its derivatives, metsulfuron and its derivatives and at least a third herbicide.

In another aspect, the present invention provides a method of selectively controlling dicotyledonous weeds infestation at a locus by treating said locus with a herbicidally effective amount of a combination comprising bensulfuron and its derivatives, metsulfuron and its derivatives and at least a third herbicide.

In yet another aspect, the present invention provides a herbicidal composition for selectively controlling the dicotyledonous weeds infestation at a locus, said composition comprising herbicidally effective amount of a combination comprising bensulfuron and its derivatives, metsulfuron and its derivatives and at least a third herbicide.

In another aspect, the present invention provides the use of a combination comprising bensulfuron and its derivatives, metsulfuron and its derivatives and at least a third herbicide for selective control of dicotyledonous weed at a locus, wherein a monocotyledonous plant species is present at said locus or is planted at said locus after the application of said combination, and wherein said combination exhibits no control, or less control, of said monocotyledonous plant species as compared with the control exhibited against the dicotyledonous weed.

In another aspect, the present invention provides a method of selectively controlling dicotyledonous weeds infestation at a locus by treating said locus with a herbicidally effective amount of a combination comprising bensulfuron and its derivatives, metsulfuron and its derivatives and at least a third herbicide, said dicotyledonous weed being selected from chickweed, speedwell, poppy, field bindweed, hairy fleabane, nettleleaf goosefoot, common groundsel, horseweed, common lambsquarters, little mallow, burning nettle, sowthistles, carpetweed, fat hen, blackberry nightshade, small flowered mallow, nettles, deadnettle, knotweed, common sowthistle, *amaranthus*, Cirsium arvense, Taraxacum officinale, *Ranunculus* repens, Senecio vulgaris, Papaver rohoeas, *Veronica* persica, Matricaria sp. Fallopia Convolvulus, *Veronica* arvensis, *Veronica* hederofolia, *Stellaria* media and *Polygonum* convolvulus.

In yet another aspect, the present invention provides a herbicide combination which comprises bensulfuron and its derivatives, metsulfuron and its derivatives and at least a third herbicide which is more active against monocotyledonous weeds than dicotyledonous weeds.

Advantages of the Present Invention can be Envisaged as
(1) A broad spectrum herbicidal composition comprising bensulfuron and its derivatives, metsulfuron and its derivatives and a third herbicide such that the combination can control a broader spectrum of weeds in lower use rates.
(2) A composition that demonstrates excellent residual activity.
(3) A composition that is not antagonistic and non-phytotoxic.

The present invention provides a method of controlling weeds by using a combination of three herbicides such that the three herbicides may demonstrate synergy that was hitherto unknown in the art.

DETAILED DESCRIPTION OF THE INVENTION

In preferred embodiments of the use of the invention as defined above, the locus is the vicinity of a desired crop.

Thus, in an aspect, the present invention provides the use of a combination comprising at least two sulfonylurea herbicides and at least a third herbicide for selective control of dicotyledonous weed at a locus, wherein a monocotyledonous plant species is present at said locus or is planted at said locus after the application of said combination, and wherein said combination exhibits no control, or less control, of said monocotyledonous plant species as compared with the control exhibited against the dicotyledonous weed. In an embodiment, the at least two sulfonylurea herbicides comprise a combination of bensulfonyl and its derivatives and metsulfuron and its derivatives.

In preferred embodiments of such use said use of a combination comprising bensulfuron and its derivatives, metsulfuron and its derivatives and at least a third herbicide is use as a herbicide applied at said locus and effective to control said dicotyledonous weed, and wherein a monocotyledonous plant species is present at said locus.

In preferred embodiments of such use said use of a combination comprising bensulfuron and its derivatives, metsulfuron and its derivatives and at least a third herbicide is use as a herbicide applied at said locus and effective to control said dicotyledonous weed, and wherein a monocotyledonous plant species is planted at said locus after said application of said combination.

In some preferred embodiments of such use said monocotyledonous plant species can be the desired crop.

In preferred embodiments of such use said combination comprising bensulfuron and its derivatives, metsulfuron and its derivatives and at least a third herbicide is substantially inactive against said monocotyledonous plant species.

In some preferred embodiments of such use a combination comprising bensulfuron and its derivatives, metsulfuron and its derivatives and at least a third herbicide can be applied to said locus before or after emergence of the dicotyledonous weed.

In some preferred embodiments of such use the combination comprising bensulfuron and its derivatives, metsulfuron and its derivatives and at least a third herbicide can be applied in an amount such that it is effective in controlling said dicotyledonous weed yet substantially inactive against monocotyledonous plant species.

In preferred embodiments of such use said third herbicide can be a herbicide which is more active against monocotyledonous weeds than dicotyledonous weeds.

In preferred embodiments of such use a combination comprising bensulfuron and its derivatives, metsulfuron and its derivatives and at least a third herbicide are applied as a herbicide combination.

In the method of the invention as defined above, of selectively controlling dicotyledonous weed, preferably said locus is locus is the vicinity of a desired crop.

In some preferred embodiments the method comprises administering an effective amount of a combination comprising at least two sulfonylurea herbicides and at least a third herbicide to the soil in which the desired crop, is present or is to be planted.

In some preferred embodiments the administration is done by application either before seeding, during seeding, or, after seeding and before the crop emerges.

In some preferred embodiments a combination comprising bensulfuron and its derivatives, metsulfuron and its derivatives and at least a third herbicide is administered prior to the emergence of any weed.

The combination comprising bensulfuron and its derivatives and metsulfuron and its derivatives has a satisfactorily good herbicidal activity. A comparatively similar distribution of herbicidal activity enhancement by use of this combination for monocotyledonous weeds as well as dicotyledonous weeds was expected. It was surprisingly found that this combination demonstrated a selectively enhanced control in the growth of dicotyledonous weeds in agronomic crops vis-à-vis the control in monocotyledonous weeds.

The term locus as used herein shall denote the vicinity of a desired crop in which weed control, typically selective weed control, of dicotyledonous weeds is desired. The locus includes the vicinity of desired crop plants wherein the weed infestation has either emerged or is yet to emerge. The term crop shall include a multitude of desired crop plants or an individual crop plant growing at a locus.

The term control indicates eradication of the investigated weed(s). A 100% control signifies total eradication of the weed(s) under investigation.

Preferably, treating the locus with a combination comprising bensulfuron and its derivatives, metsulfuron and its derivatives and at least a third herbicide comprises administering to the soil in which the desired crop is to be planted, an effective amount of the combination. The administration is preferably by application either before seeding, during seeding, or, as in most applications, after seeding and before the crop emerges, so as to prevent the emergence of any weeds.

In an embodiment, a combination comprising bensulfuron and its derivatives, metsulfuron and its derivatives and at least a third herbicide is administered prior to the emergence of any weed. The method of the present invention is particularly useful in controlling the growth of dicotyledonous weeds.

A herbicidal composition comprising a combination comprising bensulfuron and its derivatives, metsulfuron and its derivatives and at least a third herbicide, and agronomically acceptable excipients is described herein. These compositions were found useful in the practice of the enhanced use and improved method of the present invention. The agronomically acceptable excipients may be selected from carriers, inert materials, organic or inorganic solvents, minerals, mixed solvents, wetting agents and/or emulsifying agents, adhesive agents, anti-caking agents, deflocculating agents, and the like. The herbicidal composition may be formulated in the form of solid and liquid formulations.

In another aspect, the present invention provides a combination comprising at least two sulfonylurea herbicides along with at least one third herbicide. It was surprisingly found that a broad-spectrum herbicide effect was achieved with a reduced overall amount of active ingredient when a combination comprising at least two sulfonylurea herbicides was combined with a third herbicide.

The combination of sulfonylurea herbicides as used herein may be selected to be any of the two sulfonylurea herbicides selected from amidosulfuron, azimsulfuron, bensulfuron, chlorimuron, cyclosulfamuron, ethoxysulfuron, flazasulfuron, flucetosulfuron, flupyrsulfuron, foramsulfuron, halosulfuron, imazosulfuron, mesosulfuron, metazosulfuron, methiopyrisulfuron, monosulfuron, nicosulfuron, orthosulfamuron, oxasulfuron, primisulfuron, propyrisulfuron, pyrazosulfuron, rimsulfuron, sulfometuron, sulfosulfuron, trifloxysulfuron, zuomihuanglong, chlorsulfuron, cinosulfuron, ethametsulfuron, iodosulfuron, iofensulfuron, metsulfuron, prosulfuron, thifensulfuron, triasulfuron, triasulfuron, tribenuron, triflusulfuron and tritosulfuron.

In a preferred embodiment, the combination of sulfonylurea herbicides may be a combination of bensulfuron and its derivatives and metsulfuron and its derivatives.

Therefore, in another aspect, the present invention provides a combination comprising bensulfuron and its derivatives and metsulfuron and its derivatives along with a third herbicide. It was surprisingly found that a broad-spectrum herbicide effect was achieved with a reduced overall amount of active ingredient when a combination comprising bensulfuron and its derivatives and metsulfuron and its derivatives was combined with a third herbicide.

Further, following the finding of the present invention that the combination comprising bensulfuron and its derivatives, metsulfuron and its derivatives and at least a third herbicide has enhanced activity specifically against dicotyledonous weeds, it is possible to formulate the herbicide such that it is active in controlling dicotyledonous weeds, yet is less active (preferably substantially inactive) against monocotyledonous plant species. Accordingly, in a preferred embodiment of the use of a combination comprising bensulfuron and its derivatives, metsulfuron and its derivatives and at least a third herbicide for the control of a dicotyledonous weed at a locus, the combination is applied in an amount such that it is effective in controlling said dicotyledonous weed, yet is less active (preferably substantially inactive) against monocotyledonous plant species.

Typically, said monocotyledonous plant species may be a crop plant.

In this embodiment, the activity of the combination comprising bensulfuron and its derivatives, metsulfuron and its derivatives and at least a third herbicide against the monocotyledonous plant species is typically such that the mean final foliar fresh weight of the monocotyledonous plant species 21 days after application of the combination is 70% or more, more typically 80% or more, preferably 90% or more, than the weight obtained with untreated plants.

Sulfonylurea herbicides are known to be low dose herbicides that are highly efficacious when applied to target weeds. They are known to be ALS inhibitor herbicides. However, the present inventors have discovered that the combination of two sulfonylurea herbicides with completely different spectrums of weed control when combined with herbicides with specific modes of action provided a very broad and unexpected spectrum of weed control. The combinations of the present invention may be specifically useful in combating weed resistance as well as to improve the spectrum of weed control.

Preferanly, one of the sulfonylurea herbicides is metsulfuron-methyl. Metsulfuron methyl is the common name of the compound methyl 2-(4-methoxy-6-methyl-1,3,5-triazin-2-ylcarbamoylsulfamoyl)benzoate and has the chemical structure:

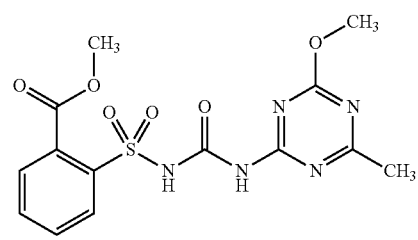 [SMILES: COC(=O)c1ccccc1S(=O)(=O)NC(=O)Nc1nc(C)nc(OC)n1]

It is known to be a selective herbicide that targets broadleaf weeds and some annual grasses. Its residual effect, as well as pre and post emergent use makes it a very good choice for weed control in crops such as barley, rice, wheat, rye etc.

Preferably, the other sulfonylurea herbicide may be bensulfuron-methyl. Bensulfuron methyl is the common name of the compound methyl α-[(4,6-dimethoxypyrimidin-2-ylcarbamoyl)sulfamoyl]-o-toluate and has the chemical structure:

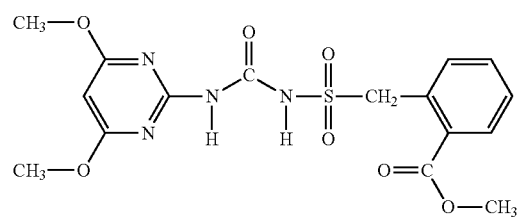 [SMILES: COC(=O)c1ccccc1CS(=O)(=O)NC(=O)Nc1nc(OC)cc(OC)n1]

It is a selective herbicide that targets weeds specifically in rice, with target weeds including sedges and broad leaf weeds.

Prior art teaches the combination of Metsulfuron methyl and Bensulfuron methyl for the control of weeds in rice, however, this combination fails to provide adequate control of weeds in other crops such as wheat, barley etc.

It has surprisingly been found that the combination of at least two sulfonyl urea herbicides, when combined with herbicides that have modes of action selected from synthetic auxins, photosystem II inhibitors, very long chain fatty acid inhibitors, or carotene biosynthesis inhibitors demonstrate synergistic behaviour in weed control. Thus in an aspect the present invention may provide a composition comprising at least two sulfonylurea herbicides and at least one herbicide selected from the group consisting of synthetic auxins, photosystem II inhibitors, very long chain fatty acid inhibitors, carotene biosynthesis inhibitors and combinations thereof.

Thus in another aspect the present invention may provide a composition comprising bensulfuron methyl, metsulfuron methyl and at least one herbicide selected from the group consisting of synthetic auxins, photosystem II inhibitors, very long chain fatty acid inhibitors, carotene biosynthesis inhibitors and combinations thereof.

Exemplary synthetic auxins include, but are not limited to, phenoxyacids such as phenoxy-acetic,-propionic and-butyric acid herbicides and their esters; phenyl acid herbicides such as 3,6-dichloro-o-anisic acid (also known as dicamba); pyridyloxy acids such as 3,5,6,pyridyloxy acetic acid (also known as triclopyr), 4-amino-3,5-dichloro-6-fluoro-2-pyridyloxyacetic acid (also known as fluroxypyr) and its esters and salts; and pyridine carboxylic acids such as 3,6-dichloropyridine-2-carboxylic acid (also known as Clopyralid), 4-Amino-3,5,6-trichloro-2-pyridinecarboxylic acid (also known as picloram) and its esters and salts. Phenoxy acetic acid herbicides include 2,4-Dichlorophenoxy acetic acid (also known as 2,4-D) and their esters and salts and 4-chloro-2-methylphenoxy acetic acid (also known as MCPA) and their esters and salts such as the 2-ethylhexyl and butoxy ethanol esters.

Preferred synthetic auxins comprise fluroxypyr and its salts and esters, 2,4-D and its salts and esters, MCPA and its salts and esters.

Exemplary photosystem II inhibitor herbicides include but are not limited to phenyl-carbamates such as ethyl 3-phenylcarbamoyloxycarbanilate (also known as desmedipham), methyl 3-(3-methylcarbaniloyloxy)carbanilate (also known as phenmedipham) and its esters; triazines such as 1-Chloro-3-ethylamino-5-isopropylamino-2,4,6-triazine (also known as atrazine); 6-chloro-$N^2,N^4$-diethyl-1,3,5-triazine-2,4-diamine (also known as simazine); triazinones such as 3-cyclohexyl-6-dimethylamino-1-methyl-1,3,5-triazine-2,4(1H,3H)-dione (also known as hexazinone), 4-amino-6-tert-butyl-4,5-dihydro-3-methylthio-1,2,4-triazin-5-one (also known as metribuzin); Uracils such as RS)-5-bromo-3-sec-butyl-6-methyluracil (also known as bromacil) and its salts and esters; benzthiadiazoles such as 3-isopropyl-1H-2,1,3-benzothiadiazin-4(3H)-one 2,2-dioxide (also known as bentazon); nitriles such as 3,5-dibromo-4-hydroxybenzonitrile; urea herbicides such as 3-(3,4-dichlorophenyl)-1,1-dimethylurea (also known as diuron), 3-(3,4-dichlorophenyl)-1-methoxy-1-methylurea (also known as linuron); amide herbicides such as 3',4'-dichloropropionanilide (also known as propanil).

Preferred photosystem II inhibitor herbicides comprise metribuzin, desmedipham, phenmedipham and propanil.

Exemplary very long chain fatty acid inhibitor herbicides include but are not limited to anilide herbicides such as 4'-fluoro-N-isopropyl-2-[5-(trifluoromethyl)-1,3,4-thiadiazol-2-yloxy]acetanilide (also known as flufenacet); acetamides such as (R)-N,N-diethyl-2-(1-naphthyloxy)propionamide (also known as napropamide-M), N,N-diethyl-2-(1-naphthalenyloxy)propanamide (also known as napropamide); Chloroacetamides such as 2-chloro-N-ethoxymethyl-6'-ethylacet-o-toluidide (acetochlor), 2-chloro-2',6'-diethyl-N-methoxymethylacetanilide (also known as alachlor) and its salts and esters, 2-chloro-N-(6-ethyl-o-tolyl)-N-[(1RS)-2-methoxy-1-methylethyl]acetamide (also known metolachlor), mix of: (aRS,1S)-2-chloro-6'-ethyl-N-(2-methoxy-1-methylethyl)acet-o-toluidide and (aRS,1R)-2-chloro-6'-ethyl-N-(2-methoxy-1-methylethyl)acet-o-toluidide (also known as S-metolachlor).

Preferred very long chain fatty acid inhibitor herbicides comprise flufenacet, napropamide-M, Napropamide and S-metolachlor.

Exemplary carotene biosynthesis inhibitor herbicides include but are not limited to 2',4'-difluoro-2-($\alpha,\alpha,\alpha$-trifluoro-m-tolyloxy)nicotinanilide (also known as diflufenican); 4-chloro-5-methylamino-2-($\alpha,\alpha,\alpha$-trifluoro-m-tolyl)pyridazin-3(2H)-one (also known as norflurazon); 4'-fluoro-6-($\alpha,\alpha,\alpha$-trifluoro-m-tolyloxy)pyridine-2-carboxanilide (also known as picolinafen); (RS)-N-benzyl-2-($\alpha,\alpha,\alpha$,4-tetrafluoro-m-tolyloxy)butyramide (also known as beflubutamid).

Preferred carotene biosynthesis inhibitor herbicides comprise diflufenican.

Thus in an embodiment, the synergetic composition of the present invention may comprise, bensulfuron methyl, metsulfuron methyl, and a third herbicide selected from at least one herbicide selected from synthetic auxins such as fluroxypyr, picloram, 2,4-D and MCPA or a mixture thereof.

In a preferred embodiment, the third herbicide is fluroxypyr.

In an embodiment, the combination of the present invention comprises bensulfuron methyl, metsulfuron methyl and fluroxypyr in a ratio from about 6:1:15 to about 20:1:60. In another embodiment, the preferred ratio is 50:4:125 i.e. 12.5:1:31.25.

In another embodiment, the synergistic composition of the present invention may comprise, bensulfuron methyl, metsulfuron methyl and a third herbicide selected from at least one photosystem II inhibitor herbicide such as metribuzin, desmedipham, phenmedipham or mixtures thereof.

In another embodiment, the synergistic composition of the present invention may comprise bensulfuron methyl, metsulfuron methyl and a third herbicide selected from very long chain fatty acid inhibitor herbicides such as flufenacet, napropamide-M, Napropamide, S-metolachlor.

In another embodiment, the synergistic composition of the present invention may comprise bensulfuron methyl, metsulfuron methyl and a third herbicide selected from carotene biosynthesis inhibitors such as diflufenican.

In an embodiment, the synergetic composition of the present invention may comprise bensulfuron methyl, metsulfuron methyl and a third herbicide selected from fluroxypyr, 2,4-D and MCPA, metribuzin, diflufenican, flufenacet napropamide-M, Napropamide, S-metolachlor or mixtures thereof.

Thus in an embodiment, bensulfuron methyl and metsulfuron methyl may be admixed in a ratio of 1:1 or from about 1:80 to 80:1.

However, the precise ratio of the three herbicides used may not be particularly limiting as it may be readily determined by a skilled artisan for appropriate efficacy.

In an embodiment, the composition of the present invention may be admixed in ratio of (1-10):(1-10):(1-80).

In an embodiment, the composition of the present invention can be applied as a tank mix, or as a formulation diluted in agrochemically acceptable diluents.

In an embodiment, the composition of the present invention can be formulated into various known types of formulations such as water dispersible granules, wettable powders, dry flowables, emulsion concentrates, suspension concentrates, capsule suspensions, ZC formulations etc.

In an embodiment, the formulations can comprise agriculturally acceptable surfactant, solid or liquid diluents, pigments, thickeners, and other known excipients.

The application of the herbicidal composition of the present invention may be pre-emergent or post-emergent, or during seed planting.

It was surprisingly found that the combination of bensulfuron methyl, metsulfuron methyl and a third herbicide selected from synthetic auxins, photosystem II inhibitors, very long chain fatty acid inhibitor, carotene biosynthesis inhibitor demonstrates a selectively enhanced control in the growth of dicotyledonous weeds in agronomic crops vis-à-vis the control in monocotyledonous weeds.

It has surprisingly been found combination of bensulfuron methyl, metsulfuron methyl shows no control or less than desirable control on a monocot weeds but demonstrates excellent activity on dicotyledonous weeds. However, the combinations of bensulfuron methyl and metsulfuron methyl demonstrates a selectively enhanced control in the growth of dicotyledonous weeds in agronomic crops vis-à-vis the control in monocotyledonous weeds. In an aspect, this distribution of efficacy of the combination of bensulfuron or its derivatives and metsulfuron or its derivatives of the present invention towards the control of dicotyledonous weeds was rather surprising, and more surprising was that the broad spectrum of control was achieved when this combination was combined with a third herbicide according to the present invention. These triple and quadruple combinations according to the present invention were never before conceived in the state of the art and represents a significant contribution of the present invention to the advancement of the state of the art.

The term locus as used herein shall denote the vicinity of a desired crop in which weed control, typically selective weed control, of dicotyledonous weeds is desired. The locus includes the vicinity of desired crop plants wherein the weed infestation has either emerged or is yet to emerge. The term crop shall include a multitude of desired crop plants or an individual crop plant growing at a locus.

In another embodiment, the present invention provides a method of controlling weeds infestation at a locus by treating said locus with a herbicidally effective amount of bensulfuron or its derivatives, metsulfuron or its derivatives and a third herbicide.

In an embodiment, the third herbicide is selected from synthetic auxins, photosystem II inhibitors, very long chain fatty acid inhibitors, or carotene biosynthesis inhibitors or mixtures thereof.

Exemplary synthetic auxins include, but are not limited to phenoxyacids such as phenoxy-acetic,-propionic and-butyric acid herbicides and their esters; phenyl acid herbicides such as 3,6-dichloro-o-anisic acid (also known as dicamba); pyridyloxy acids such as 3,5,6,pyridyloxy acetic acid (also known as triclopyr), 4-amino-3,5-dichloro-6-fluoro-2-pyridyloxyacetic acid (also known as fluroxypyr) and its esters and salts; and pyridine carboxylic acids such as 3,6-dichloropyridine-2-carboxylic acid (also known as Clopyralid), 4-Amino-3,5,6-trichloro-2-pyridinecarboxylic acid (also known as picloram) and its esters and salts. Phenoxy acetic acid herbicides including 2,4-Dichlorophenoxy acetic acid (also known as 2,4-D) and their esters and salts and 4-chloro-2-methylphenoxy acetic acid (also known as MCPA) and their esters and salts such as the 2-ethylhexyl and butoxy ethanol esters.

Preferred synthetic auxins comprise fluroxypyr and its salts and esters, 2,4-D and its salts and esters, MCPA and its salts and esters.

Exemplary photosystem II inhibitor herbicides include but are not limited to phenyl-carbamates such as ethyl 3-phenylcarbamoyloxycarbanilate (also known as desmedipham), methyl 3-(3-methylcarbaniloyloxy)carbanilate (also known as phenmedipham) and its esters; triazines such as 1-Chloro-3-ethylamino-5-isopropylamino-2,4,6-triazine (also known as atrazine); 6-chloro-N2,N4-diethyl-1,3,5-triazine-2,4-diamine (also known as simazine); triazinones such as 3-cyclohexyl-6-dimethylamino-1-methyl-1,3,5-triazine-2,4(1H,3H)-dione (also known as hexazinone), 4-amino-6-tert-butyl-4,5-dihydro-3-methylthio-1,2,4-triazin-5-one (also known as metribuzin); Uracils such as RS)-5-bromo-3-sec-butyl-6-methyluracil (also known as bromacil) and its salts and esters; benzthiadiazoles such as 3-isopropyl-1H-2,1,3-benzothiadiazin-4(3H)-one 2,2-dioxide (also known as bentazon); nitriles such as 3,5-dibromo-4-hydroxybenzonitrile; urea herbicides such as 3-(3,4-dichlorophenyl)-1,1-dimethylurea (also known as diuron), 3-(3,4-dichlorophenyl)-1-methoxy-1-methylurea (also known as linuron); amide herbicides such as 3',4'-dichloropropionanilide (also known as propanil).

Preferred photosystem II inhibitor herbicides comprise metribuzin, desmedipham, phenmedipham and propanil.

Exemplary very long chain fatty acid inhibitor herbicides include but are not limited to anilide herbicides such as 4'-fluoro-N-isopropyl-2-[5-(trifluoromethyl)-1,3,4-thiadiazol-2-yloxy]acetanilide (also known as flufenacet); acetamides such as (R)-N,N-diethyl-2-(1-naphthyloxy)propionamide (also known as Napropamide-M), N,N-diethyl-2-(1-naphthalenyloxy)propanamide (also known as Napropamide); Chloroacetamides such as 2-chloro-N-ethoxymethyl-6'-ethylacet-o-toluidide (acetochlor), 2-chloro-2',6'-diethyl-N-methoxymethylacetanilide (also known as alachlor) and its salts and esters, 2-chloro-N-(6-ethyl-o-tolyl)-N-[(1RS)-2-methoxy-1-methylethyl]acetamide (also known metholachlor), mix of: (a RS,1S)-2-chloro-6'-ethyl-N-(2-methoxy-1-methylethyl)acet-o-toluidide and (aRS,1R)-2-chloro-6'-ethyl-N-(2-methoxy-1-methylethyl)acet-o-toluidide (also known as S-metolachlor).

Preferred very long chain fatty acid inhibitor herbicides comprise flufenacet, napropamide-M, Napropamide, S-metolachlor.

Exemplary carotene biosynthesis inhibitor herbicides include but are not limited to 2',4'-difluoro-2-(α,α,α-trifluoro-m-tolyloxy)nicotinanilide (also known as diflufenican); 4-chloro-5-methylamino-2-(α,α,α-trifluoro-m-tolyl)pyridazin-3(2H)-one (also known as norflurazon); 4'-fluoro-6-(α,α,α-trifluoro-m-tolyloxy)pyridine-2-carboxanilide (also known as picolinafen); (RS)-N-benzyl-2-(α,α,4-tetrafluoro-m-tolyloxy)butyramide (also known as beflubutamid).

Preferred carotene biosynthesis inhibitor herbicides comprise diflufenican.

In an embodiment, the present invention provides a method of controlling dicotyledonous weeds infestation at a locus by treating said locus with a herbicidally effective amount of bensulfuron or its derivatives, metsulfuron or its derivatives and a synthetic auxin selected from fluroxypyr and its salts and esters, 2,4-D and its salts and esters and MCPA and its salts and esters.

In an embodiment, the present invention provides a method of controlling weeds infestation at a locus by treating said locus with a herbicidally effective amount of bensulfuron or its derivatives, metsulfuron or its derivatives and a third herbicide which is a photosystem II inhibitor herbicide selected from metribuzin, desmedipham, phenmedipham and propanil.

In an embodiment, the present invention provides a method of controlling weeds infestation at a locus by treating said locus with a herbicidally effective amount of bensulfuron or its derivatives, metsulfuron or its derivatives and diflufenican.

In an embodiment, the present invention provides a method of controlling weeds infestation at a locus by treating said locus with a herbicidally effective amount of bensulfuron or its derivatives, metsulfuron or its derivatives and a third herbicide which is flufenacet.

The herbicidal composition of the present invention maybe used to target weeds among the crops such as winter wheat, spring wheat, barley, oats, triticale, winter oilseed rape, strawberries, blackcurrants, gooseberries, raspberries, field trees, shrubs, broccoli, cabbage, calabrese, cauliflower, kale and Brussel's sprouts.

In an embodiment, the dicotyledonous weeds which were found surprisingly susceptible to the present composition are selected from the group comprising chickweed, speedwell, poppy, field bindweed, hairy fleabane, nettleaf goosefoot, common groundsel, horseweed, common lambsqaurters, little mallow, burning nettle, sowthistles, carpetweed, fat hen, blackberry nightshade, small flowered mallow, nettles, deadnettle, knotweed, common sowthistle and *amaranthus*.

However, it should be understood that the use of the composition of the present invention and a method of the present invention is not limited to the control of these weeds alone but is applicable to any weed as long as a triple or quadruple or higher combination of the present invention is utilized.

The herbicide of the invention can be applied to the soil or to crops in any amount which will give the required control of weeds.

In an embodiment, the dicotyledonous weeds may be selected from the group consisting of *Acalypha gracilens, Acalypha ostryifolia, Acalypha rhomboidea, Acalypha virginica, Acer rubrum, Acer saccharinum, Actaea pachypoda, Actaea racemosa, Aeschynomene virginica, Agalinis purpurea, Agalinis setacea, Agalinis tenuifolia, Agastache nepetoides, Agastache scrophulariifolia, Ageratina altissima, Ageratina aromatica, Agrimonia parviflora, Agrimonia pubescens, Agrimonia rostellata, Alnus serrulata, Amaranthus cannabinus, Amaranthus hybridus, Amaranthus spinosus, Ambrosia artemisfifolia, Ambrosia trifida, Amelanchier arborea, Amelanchier Canadensis, Amelanchier laevis, Amelanchier obovalis, Amelanchier stolonifera, Amorpha fruticosa, Amphicarpaea bracteata, Anaphalis margaritacea, Anemone quinquefolia, Anemone virginiana, Angelica venenosa, Antennaria plantaginifolia, Apocynum androsaemifolium, Apocynum cannabinum, Aquilegia Canadensis, Arabis lyrata, Aralia nudicaulis, Aralia racemosa, Aralia spinosa, Argemone Mexicana, Aristolochia serpentaria, Amoglossum atriplicifolium, Amoglossum reniforme, Artemisia campestris, Artemisia ludoviciana, Asarum canadense, Asclepias amplexicaulis, Asclepias incarnate, Asclepias purpurascens, Asclepias quadrifolia, Asclepias rubra, Asclepias syriaca, Asclepias tuberose, Asclepias variegate, Asclepias verticillata, Aureolaria pedicularia, Aureolaria virginica, Baccharis halimifolia, Baptisia tinctoria, Bartonia paniculata, Bartonia virginica, Betula nigra, Betula populifolia, Bidens aristosa, Bidens bidentoides, Bidens bipinnata, Bidens cernua, Bidens coronate, Bidens discoidea, Bidens frondosa, Bidens laevis, Bidens tripartite, Boehmeria cylindrical, Brasenia schreberi, Brickellia eupatorioides, Cakile edentula, Callitriche heterophylla, Callitriche terrestris, Caltha palustris, Calystegia spithamaea, Campanula aparinoides, Campsis radicans, Cardamine bulbosa, Cardamine concatenate, Cardamine parviflora, Cardamine pensylvanica, Carya alba, Carya glabra, Carya ovate, Carya pallid, Castanea dentate, Castanea pumila, Castilleja coccinea, Catalpa bignonioides, Ceanothus americanus, Celastrus scandens, Celtis occidentalis, Celtis tenuifolia, Cephalanthus occidentalis, Cerastium nutans, Ceratophyllum demersum, Cercis Canadensis, Chaerophyllum procumbens, Chamaecrista fasciculate, Chamaecrista nictitans, Chamaedaphne calyculata, Chamaesyce maculate, Chamaesyce nutans, Chamaesyce polygonifolia, Chamerion angustifolium, Chelone glabra, Chenopodium pratericola, Chenopodium rubrum, Chenopodium simplex, Chimaphila maculate, Chimaphila umbellate, Chionanthus virginicus, Chrysopsis mariana, Chtysosplenium americanum, Cicuta bulbifera, Cicuta maculate, Hybanthus con color, Hydrastis Canadensis, Hydrocotyle Americana, Hydrocotyle umbellate, Hydrocotyle verticillata, Hypericum boreale, Hypericum canadense, Hypericum crux-andreae, Hypericum densiflorum, Hypericum denticulatum, Hypericum ellipticum, Hypericum gentianoides, Hypericum hypericoides, Hypericum majus, Hypericum mutilum, Hypericum punctatum, Ilex glabra, Ilex laevigata, Ilex mucronata, Ilex opaca, Ilex verticillata, Impatiens capensis, lonactis linariifolius, Ipomoea pandurata, Itea virginica, Juglans cinerea, Juglans nigra, Kalmia angustifolia, Kalmia latifolia, Kosteletzkya virginica, Krigia biflora, Krigia virginica, Lactuca biennis, Lactuca Canadensis, Lactuca hirsute, Laportea Canadensis, Lathyrus palustris, Lathyrus venosus, Lechea minor, Lechea mucronata, Lechea racemulosa, Leiophyllum buxifolium, Lepidium densiflorum, Lepidium virginicum, Lespedeza angustifolia, Lespedeza capitata, Lespedeza frutescens, Lespedeza hirta, Lespedeza repens, Lespedeza stuevei, Lespedeza violacea, Lespedeza virginica, Liatris pilosa, Liatris spicata, Limosella australis, Lindera benzoin, Lindernia dubia, Linum intercursum, Linum striatum, Linum virginianum, Liquidambar styraciflua, Liriodendron tulipifera, Lobelia canbyi, Lobelia cardinalis, Lobelia inflate, Lobelia nuttallii, Lobelia spicata, Ludwigia altemifolia, Ludwigia hirtella, Ludwigia palustris, Ludwigia sphaerocarpa, Lupinus perennis, Lycopus americanus, Lycopus amplectens, Lycopus rubellus, Lycopus uniflorus, Lycopus virginicus, Lyonia ligustrina, Lyonia mariana, Lysimachia ciliate, Lysimachia hybrid, Lysimachia quadrifolia, Lysimachia terrestris, Lysimachia thyrsiflora, Magnolia tripetala, Magnolia virginiana, Melampyrum lineare, Menispermum canadense, Mentha Ã-piperita, Mentha arvensis, Menyanthes trifoliate, Micranthemum micranthemoides, Mikania scandens, Mimulus alatus, Mimulus ringens, Minuartia caroliniana, Mirabilis nyctaginea, Mitchella repens, Moehringia lateriflora, Mollugo verticillata, Monarda punctata, Monotropa hypopithys, Monotropa uniflora, Morella caroliniensis, Morella cerifera, Morella pensylvanica, Morus rubra, Myosotis taxa, Myosotis verna, Myrica gale, Myriophyllum humile, Myriophyllum pinnaturn, Myriophyllum tenellum, Nelumbo lutea, Nuphar lutea, Nuttallanthus Canadensis, Nymphaea odorata, Nyssa sylvatica, Obolaria virginica, Oclemena nemoralis, Oenothera biennis, Oenothera fruticosa, Oenothera laciniata, Oenothera perennis, Oldenlandia uniflora, Oligoneuron rigidum, Onosmodium virginianurn, Opuntia humifusa, Orthilia secunda, Osmorhiza claytonia, Osmorhiza longistylis, Oxalis dillenii, Oxalis stricta, Oxypolis rigidior, Packera aurea, Packera obovata, Packera paupercula, Panax trifolius, Paronychia Canadensis, Paronychia fastigiata, Parthenocissus quinquefolia, Pedicularis Canadensis, Pedicularis lanceolata, Penstemon hirsutus, Penstemon laevigatus, Penthorum sedoides, Phlox divaricata, Phlox maculate, Phlox pilosa, Phlox subulata, Phoradendron leucarpum, Photinia floribunda, Photinia melanocarpa, Photinia pyrifolia, Phtyma leptostachya, Physalis heterophylla, Physalis longifolia, Physalis pubescens, Physocarpus opulifolius, Phytolacca Americana, Pilea Fontana, Pilea pumila, Plantago aristata, Plantago pusilla, Plantago virginica, Platanus occidentalis, Pluchea foetida, Podophyllum peltatum, Polemonium reptans, Polygala brevifolia, Polygala cruciata, Polygala incarnate, Polygala lutea, Polygala mariana, Polygala nuttaffii, Polygala polygama, Polygala sanguine, Polygala senega, Polygala verticillata, Polygonalla articulate, Polygonum amphibium, Polygonum arifolium, Polygonum careyi, Polygonum* erectum, Polygonum hydropiperoides, Polygonum lapathifolium, Polygonum pensylvanicum, Polygonum punctatum, Polygonum robustius, Polygonum sagittatum, Polygonum tenue, Populus grandidentata, Populus tremuloides, Potentilla arguta, Potentilla Canadensis, Potentilla norvegica, Potentilla simplex, Prenanthes altissima, Prenanthes autumnalis, Prenanthes serpentaria, Prenanthes trifoliolata, Proserpinaca intermedia, Proserpinaca palustris, Proserpinaca pectinata, Prunella vulgaris, Prunus Americana, Prunus angustifolia, Prunus maritime, Prunus pumila, Prunus serotina, Pseudognaphalium helleri, Pseudognaphalium obtusifolium, Ptilimnium capillaceum, Pycnanthemum clinopodioides, Pycnanthemum incanum, Pycnanthemum muticum, Pycnanthemum tenuifolium, Pycnanthemum verticillatum, Pycnanthemum virginianurn, Pyrola Americana, Pyrola chlorantha, Pyrola elliptica, Pyxidanthera barbulata, Quercus alba, Quercus coccinea, Polygonum pensylvanicum, Polygonum punctaturn, Polygonum robustius, Polygonum sagittatum, Polygonum tenue, Populus grandidentata, Populus tremuloides, Potentilla arguta, Potentilla Canadensis, Potentilla norvegica, Potentilla simplex, Prenanthes altissima, Prenanthes autumnalis, Prenanthes serpentaria, Prenanthes trifoliolata, Proserpinaca intermedia, Proserpinaca palustris, Proserpinaca pectinata, Prunella vulgaris, Prunus Americana, Prunus angustifolia, Prunus maritime, Prunus pumila, Prunus serotina, Pseudognaphalium helleri, Pseudognaphalium obtusifolium, Ptilimnium capillaceum, Pycnanthemum clinopodioides, Pycnanthemum incanum, Pycnanthemum muticum, Pycnanthemum tenuifolium, Pycnanthemum verticillaturn, Pycnanthemum virginianurn, Pyrola Americana, Pyrola chlorantha, Pyrola elliptica, Pyxidanthera barbulata, Quercus alba, Quercus coccinea, Quercus ilicifolia, Quercus marilandica, Quercus michauxii, Quercus palustris, Quercus phellos, Quercus prinoides, Quercus prinus, Quercus rubra, Quercus stellata, Ranunculus ambigens, Ranunculus hispidus, Ranunculus longirostris, Ranunculus pensylvanicus, Ranunculus pusillus, Ranunculus recurvatus, Ranunculus sceleratus, Ranunculus trichophyllus, Rhexia mariana, Rhexia virginica, Rhododendron maximum, Rhododendron periclymenoides, Rhododendron prinophyllum, Rhododendron viscosum, Rhus copallinum, Rhus glabra, Rhus typhina, Ribes americanum, Robinia pseudoacacia, Robinia viscose, Rorippa palustris, Rosa Carolina, Rotala ramosior, Rubus Canadensis, Rubus cuneifolius, Rubus flagellaris, Rubus hispidus, Rubus occidentalis, Rudbeckia hirta, Rudbeckia laciniata, Rumex altissimus, Rumex orbiculatus, Sabatia angularis, Sabatia difformis, Sagina decumbens, Salix bebbiana, Salix discolor, Salix eriocephala, Salix humilis, Salix interior, Salix nigra, Salix petiolaris, Salix sericea, Salvia lyrata, Sanguinaria Canadensis, Sanguisorba Canadensis, Sanicula Canadensis, Sanicula marilandica, Sarracenia purpurea, Saururus cernuus, Saxifraga pensylvanica, Saxifraga virginiensis, Schwalbea Americana, Scrophularia lanceolata, Scrophularia marilandica, Scutellaria elliptica, Scutellaria galericulata, Scutellaria integrifolia, Scutellaria lateriflora, Senna hebecarpa, Sericocarpus asteroids, Sericocarpus linifolius, Sicyos angulatus, Sida spinosa, Silene antirrhina, Silene stellata, Sium suave, Solanum carolinense, Solanum ptycanthum, Solanum rostratum, Solidago bicolor, Solidago caesia, Solidago erecta, Solidago fistulosa, Solidago flexicaulis, Solidago gigantean, Solidago juncea, Solidago latissimifolia, Solidago nemoralis, Solidago odora, Solidago patula, Solidago puberula, Solidago rugosa, Solidago sempervirens, Solidago stricta, Solidago uliginosa, Solidago ulmifolia, Spergularia salina, Spiraea alba, Stachys hyssopifolia, Stachys palustris, Stachys tenuifolia, Staphylea trifolia, Stellaria longifolia, Stellaria pubera, Strophostyles helvola, Strophostyles umbellate, Stylosanthes biflora, Symphyotrichum cordifolium, Symphyotrichum dumosum, Symphyotrichum ericoides, Symphyotrichum leave, Symphyotrichum lanceolaturn, Symphyotrichum laterffiorum, Symphyotrichum novi-belgii, Symphyotrichum patens, Symphyotrichum pilosum, Symphyotrichum puniceum, Symphyotrichum subulaturn, Symphyotrichum undulatum, Teucrium canadense, Thalictrum pubescens, Thalictrum revolutum, Thalictrum thalictroides, Thaspium barbinode, Thaspium trifoliaturn, Tilia Americana, Toxicodendron pubescens, Toxicodendron radicans, Toxicodendron vernix, Triadenum virginicum, Trichosterna brachiatum, Trichosterna dichotomum, Trichosterna setaceum, Trientalis borealis, Triodanis perfoliata, Ulmus Americana, Ulmus rubra, Utricularia geminiscapa, Utricularia gibba, Utricularia intermedia, Utricularia juncea, Utricularia macrorhiza, Utricularia purpurea, Utricularia radiate, Utricularia striata, Utricularia subulata, Vaccinium angustifolium, Vaccinium cotymbosum, Vaccinium fuscatum, Vaccinium macrocarpon, Vaccinium stamineum, Valerianella umbilicata, Verbena hastate, Verbena simplex, Verbena urticifolia, Verbesina alternifolia, Veronica anagallis-aquatica, Veronica peregrine, Veronica scutellata, Veronicastrum virginicum, Viburnum acerifolium, Viburnum dentatum, Viburnum nudum, Viburnum prunifolium, Viola Ã-palmate, Viola affinis, Viola bicolor, Viola blanda, Viola brittoniana, Viola cucullata, Viola hirsutula, Viola labradorica, Viola lanceolata, Viola macloskeyi, Viola pedata, Viola pubescens, Viola sagittata, Viola triloba, Vitis aestivalis, Vitis labrusca, Vitis riparia, Vitis vulpine, Xanthium strumarium, and Zizia aptera.

In another embodiment, the use and method of the present invention is effective against dicotyledonous weeds selected from Cirsium arvense, Taraxacum officinale, Ranunculus repens, Senecio vulgaris, Papaver rohoeas, Veronica persica, Matricaria sp., Fallopia Convolvulus, Veronica arvensis, Veronica hederofolia, Stellaria media and Polygonum convolvulus.

The method of control of the present invention may be carried out by spraying the suggested tank mixes, or the individual herbicides may be formulated as a kit-of-parts containing various components that may be mixed as instructed prior to spraying.

In an embodiment the components of the present invention may be packaged such that the bensulfuron methyl, metsulfuron and a third herbicide may be packaged separately and then tank mixed before the spraying.

In another embodiment the components of the present invention may be packaged such that bensulfuron methyl and metsulfuron methyl may be packaged separately, whereas, the third herbicide and other additives are packaged separately, such that the two maybe tank mixed at the time of spraying.

The herbicidal composition and method of the present invention can offer some particular advantages over the compositions known in the prior art. The synergistic composition of the present invention can be used to control a broader spectrum of weeds encompassing both monocots and dicots. The present invention demonstrates a better weed control capacity at reduced volumes thereby making it more environmentally friendly.

The invention shall now be described with reference to the following specific examples. It should be noted that the example(s) appended below illustrate rather than limit the invention, and that those skilled in the art will be able to design many alternative embodiments without departing from the scope of the present invention.

EXAMPLES

Synergy Studies

Studies were conducted to compare the weed controlling activity of the combination of bensulfuron methyl, metsulfuron methyl with herbicides selected from the classes of synthetic auxins, photosystem II inhibitors, very long chain fatty acid inhibitor, carotene biosynthesis inhibitor and compare its observed efficacy with the "expected" efficacy when bensulfuron methyl and metsulfuron methyl and select individual herbicides were used to treat both dicotyledonous and monocotyledonous weeds. Any difference between the observed and "expected" efficacy could be attributed to synergy between the two compounds in the control of monocotyledonous weeds. The expected efficacy of a combination of bensulfuron methyl, metsulfuron methyl with herbicides selected from the classes of synthetic auxins, photosystem II inhibitors, very long chain fatty acid inhibitor, carotene biosynthesis inhibitor was calculated using the well-established Colby method.

In the Colby method, the expected (or predicted) response of a combination of herbicides is calculated by taking the product of the observed response for each individual component of the combination when applied alone divided by 100 and subtracting this value from the sum of the observed response for each component when applied alone. An unexpected enhancement in efficacy of the combination is then determined by comparing the observed response of the combination to the expected (or predicted) response as calculated from the observed response of each individual component alone. If the observed response of the combination is greater than the expected (or predicted) response, or stated conversely, if the difference between the observed and expected response is greater than zero, then the combination is said to be synergistic or unexpectedly effective. (Colby, S. R., Weeds, 1967(15), p. 20-22) The Colby method requires only a single dose of each herbicide applied alone and the mixture of both doses. The formula used to calculate the expected efficacy (EE) which was compared with the observed efficacy (OE) to determine the efficacy of the present invention is explained hereinbelow:

$$EE = (B \text{ efficacy} + A \text{ efficacy} - (B \text{ efficacy} \times A \text{ efficacy})/100)$$

The weed control activity of the individual herbicides of the invention and their combinations were evaluated on weeds such as *Viola arvensis* (weed code—VIOAR), *Veronica persica* (weed code—VERPE), *Papaver rhoeas* (weed code: PAPRH), *Galium aparine* (weed code—GALAP), *Matricaria recutita* weed code—MATCH), *Veronica hederifolia* (weed code—VERHE) and *Viola arvensis* (weed code—VIOAR.). The trial was carried out in Randomized Complete Block (RCB) method, all field trials were conducted using this method. Each trial were replicated four times and conducted under GEP guidelines. Application volumes were varied for each mixture. Such field trials were carried out at various locations so as to generate independent data, the locations were chosen randomly across European nations. Bensulfuron methyl and Metsulfuron methyl and selected herbicides were sprayed according to their recommended dosage.

The following formula was used to calculate the expected activity of mixtures containing active ingredients, A and B:

$$\text{Expected } (E) \quad A + B - \frac{AB}{100}$$

Where
A=observed efficacy of active ingredient (combination of bensulfuron methyl+metsulfuron methyl) A at the same concentration as used in the mixture.
B=observed efficacy of active ingredient B (third herbicide) at the same concentration as used in the mixture.

However, following formula was used to calculate the expected activity of mixtures containing three active ingredients, A, B and C:

$$\text{Expected } (E) \quad A + B + C - \frac{(AB + AC + BC)}{100} + \frac{ABC}{10,000}$$

Where
A=observed efficacy of active ingredient A at the same concentration as used in the mixture.
B=observed efficacy of active ingredient B at the same concentration as used in the mixture.
C=observed efficacy of active ingredient C at the same concentration as used in the mixture.

The herbicide tank mix combinations, application rates, plant species tested, and results are given in the following examples:

Examples 1:

Bensulfuron Methyl, Metsulfuron Methyl and Fluroxypyr Field trials were carried out to test the synergy of the combination bensulfuron methyl, metsulfuron methyl and synthetic auxin fluroxypyr. The field trials were carried out at various locations in Europe during spring. The percentage efficacy was calculated after 60 days of applications. The target weed was *Viola arvensis* (weed code—VIOAR) and *Veronica persica* (weed code—VERPE) and the results are recorded in the table below:

TABLE 1

| | | | % Weed control | | | | | |
|---|---|---|---|---|---|---|---|---|
| | Dose | | VIOAR Weed control in Triticum aesti at | | VIOAR Weed control in Triticum aesti at | | VERPE Weed control in Triticum aesti at | | VERPE Weed control in Triticum aesti at |
| | Rate | | 20 DAA | | 57 DAA | | 20 DAA | | 57 DAA |
| Active | Unit | Expected | Actual | Expected | Actual | Expected | Actual | Expected | Actual |
| Untreated Check | | | 0.00 | | 0.00 | | 0.00 | | 0.00 |
| Bensulfuron methyl + Metsulfuron methyl | 50 g + 4 g | | 86 | | 86 | | 85 | | 80 |

TABLE 1-continued

| | | % Weed control | | | | | | | |
|---|---|---|---|---|---|---|---|---|---|
| | Dose | VIOAR Weed control in Triticum aesti at | | VIOAR Weed control in Triticum aesti at | | VERPE Weed control in Triticum aesti at | | VERPE Weed control in Triticum aesti at | |
| | Rate | 20 DAA | | 57 DAA | | 20 DAA | | 57 DAA | |
| Active | Unit | Expected | Actual | Expected | Actual | Expected | Actual | Expected | Actual |
| Fluroxypyr | 125 g | | 31 | | 28 | | 51 | | 55 |
| Bensulfuron methyl + Metsulfuron methyl + Fluroxypyr | 50 g + 4 g + 125 g | 90.34 | 94 | 88.92 | 94 | 92.62 | 96 | 91 | 98 |
| Observed-Expected efficacy | | 3.66 | | 5.08 | | 3.38 | | 7.00 | |

In the Colby method, the expected (or predicted) response of a combination of herbicides is calculated by taking the product of the observed response for each individual component of the combination when applied alone divided by 100 and subtracting this value from the sum of the observed response for each component when applied alone. An unexpected enhancement in efficacy of the combination is then determined by comparing the observed response of the combination to the expected (or predicted) response as calculated from the observed response of each individual component alone. If the observed response of the combination is greater than the expected (or predicted) response, or stated conversely, if the difference between the observed and expected response is greater than zero, then the combination is said to be synergistic or unexpectedly effective.

Thus, when the combination of the present invention was analyzed using this method, it demonstrated an observed—expected value of greater than zero which is indicative of an unexpected efficacy. The basis of demonstration of unexpected efficacy by comparison with the Colby formula is that herbicide (A) tested alone would kill a proportion of the target weeds and leave the remaining portion (a %) as survivors. Similarly, herbicide B tested alone will leave (b %) as survivors. When combined, A+B will, act independently on the target weed (if unexpected activity is absent); component A leaving a % survivors, which survivors will be controlled by component B; which has an overall effect of a %*b %*100. Subsequently, if the percent control is greater than that predicted by the Colby formula or stated conversely, if the difference between the observed control and the expected control is greater than zero; then unexpected enhancement in activity is acknowledged. The degree to which the difference is greater than zero is not itself critical as long as it is greater than zero; however greater the difference, more significant is the enhancement or the unexpectedness in weed control.

Further field trials were carried out to test the synergy of the combination bensulfuron methyl, metsulfuron methyl and synthetic auxin fluroxypyr. The field trials were carried out at various locations in Europe during spring. The percentage efficacy was calculated after 60 days of applications. The target weed was Papaver rhoeas (weed code—PAPRH) and the results are recorded in the table below:

TABLE 2

| | | % Weed control | | | |
|---|---|---|---|---|---|
| | Dose | PAPRH Weed control in Triticum aesti at | | PAPRH Weed control in Triticum aesti at | |
| | Rate | 12 DAA | | 12 DAA | |
| Active | Unit | Expected | Actual | Expected | Actual |
| Untreated Check | | | 0.00 | | |
| Bensulfuron methyl | 50 g | | 50 | | 50 |
| Metsulfuron methyl | 4 g | | 48 | | 48.8 |
| Fluroxypyr | 125 g | | 28 | | 79 |
| Bensulfuron methyl + Metsulfuron methyl + Fluroxypyr | 50 g + 4 g + 125 g | 81.28 | 90 | 94.54 | 99 |
| Observed-Expected efficacy | | 8.72 | | 4.46 | |

The results in tables 1 and 2 clearly demonstrate a synergy when the combination of bensulfuron methyl, metsulfuron methyl and fluroxypyr was used to control the Papaver rhoeas (weed code—PAPRH) well as *Viola* arvensis (weed code—VERPE) and *Veronica* persica (weed code—VIOAR).

Example 2

Field trials were carried out test the synergy of the combination bensulfuron methyl, metsulfuron methyl, and synthetic auxin 2,4-D. The field trials were carried out at various locations in Europe during spring. The percentage efficacy was calculated after 60 days of applications. The target weed were Senecio vulgaris (weed code—SENVU), Rapistrum rugosum (weed code—RASRU), Papaver rhoeas (weed code—PAPRH), *Viola* arvensis (Weed code—VIOAR), Roemeria hybrida (Weed code—is ROEHY), Galium aparine (Weed code—GALAP) and the results are recorded in the tables 3 and 4 below:

TABLE 3

| | | % Weed control | | | | | |
|---|---|---|---|---|---|---|---|
| | | SENVU Weed control in Triticum aesti at | | RASRU Weed control in Triticum aesti at | | PAPRH Weed control in Triticum aesti at | |
| Dose | | 9 DAA | | 12 DAA | | 12 DAA | |
| Active | Rate Unit | Expected | Actual | Expected | Actual | Expected | Actual |
| Untreated Check | | | 63.4 | | 4.0 | | 33.8 |
| Bensulfuron methyl + Metsulfuron methyl | 0.1 Kg/ha | | 48.0 | | 34.8 | | 35.0 |
| 2,4D dimethylamine salt | 2.6 l/ha | | 62.5 | | 32.4 | | 37.5 |
| Bensulfuron methyl + Metsulfuron methyl + 2,4D dimethylamine salt | 2.6 l/ha + 0.1 Kg/ha | 80.5 | 82.3 | 55.9 | 67.6 | 59.3 | 81.3 |
| Observed-Expected efficacy | | 1.8 | | 11.7 | | 22 | |

TABLE 4

| | | % Weed control | | | | | |
|---|---|---|---|---|---|---|---|
| | | VIOAR Weed control in Triticum aesti at 12 DAA | | ROEHY Weed control in Triticum aesti at 15 DAA | | | |
| Dose | | | | | | | |
| Active | Rate Unit | Expected | Actual | Expected | Actual | | |
| Untreated Check | | | 21.3 | | 0.00 | | |
| Bensulfuron methyl + Metsulfuron methyl | 0.1 Kg/ha | | 12.5 | | 28.8 | | |
| 2,4D dimethylamine salt | 2.6 l/ha | | 18.8 | | 37.5 | | |
| Bensulfuron methyl + Metsulfuron methyl + 2,4D dimethylamine salt | 0.1 Kg/ha + 2.6 l/ha | 28.95 | 52.5 | 55.5 | 60 | | |
| Observed-Expected efficacy | | 23.55 | | 4.45 | | | |

Tables 3 and 4 clearly demonstrate synergy when bensulfuron methyl, metsulfuron methyl and 2,4-D dimethylamine salt demonstrated synergy in the control of a broad spectrum of weeds. No phytotoxicity was observed.

Example 3

Field trials were carried out test the synergy of the combination bensulfuron methyl, metsulfuron methyl, and synthetic auxin MCPA dimethylamine salt. The field trials were carried out at various locations in Europe during spring. The percentage efficacy was calculated after 60 days of applications. The target weed were Galeopsis tetrahit (weed code—GAETE), Papaver rhoeas (weed code—PAPRH), and Rapistrum rugosum (Weed code—RASRU) and the results are recorded in the table 5:

TABLE 5

| | | | % Weed control | | | | |
|---|---|---|---|---|---|---|---|
| | Dose | | PAPRH Weed control in Triticum aesti at | | RASRU Weed control in Triticum aesti at | | RASRU Weed control in Triticum aesti at |
| | Rate | | 12 DAA | | 12 DAA | | 56 DAA |
| Active | Unit | | Expected | Actual | Expected | Actual | Expected | Actual |
| Untreated Check | | | | 33.8 | | 4.0 | | 6.0 |
| Bensulfuron methyl + Metsulfuron methyl | 0.1 kg/ha A | | | 35 | | 75.0 | | 75.0 |
| MCPA dimethylamine salt | 4 l/ha | | | 63.8 | | 34.8 | | 88.3 |
| Bensulfuron methyl + Metsulfuron methyl + MCPA dimethylamine salt | 0.1 kg/ha A + 4 l/ha | | 76.4 | 87.5 | 83.7 | 85 | 97.0 | 98.3 |
| Observed-Expected efficacy | | | | 11.3 | | 1.3 | | 1.22 |

The results in table 5 clearly demonstrates synergy between bensulfuron methyl, metsulfuron methyl and MCPA dimethylamine salt in controlling various weeds in winter wheat. No phytotoxicity was observed.

Example 4

Field trials were carried out to test the synergy of the combination bensulfuron methyl, metsulfuron methyl, and carotenoid biosynthesis inhibitor diflufenican. The field trials were carried out at various locations in Europe during spring. The percentage efficacy was calculated after 60 days of applications. The target weed were weeds in general and Galium aparine (Weed code—GALAP) and the results are recorded in the tables 6 and 7 below:

TABLE 6

| | | | % Weed control | | | | |
|---|---|---|---|---|---|---|---|
| | Dose | | TTTTT Weed control in Triticum aesti at | | TTTTT Weed control in Triticum aesti at | | TTTT Weed control in Triticum aesti at |
| | Rate | | 12 DAA | | 12 DAA | | 12 DAA T |
| Active | Unit | | Expected | Actual | Expected | Actual | Expected | Actual |
| Untreated Check | | | | 36.7 | | 16 | | 93.3 |
| Bensulfuron methyl + Metsulfuron methyl | 50 g + 4 g | | | 25.0 | | 25 | | 60 |

TABLE 6-continued

| | | % Weed control | | | | | |
|---|---|---|---|---|---|---|---|
| | | TTTTT Weed control in Triticum aesti at | | TTTTT Weed control in Triticum aesti at | | TTTT Weed control in Triticum aesti at | |
| Dose | | 12 DAA | | 12 DAA | | 12 DAA T | |
| Active | Rate Unit | Expected | Actual | Expected | Actual | Expected | Actual |
| Diflufenican | 0.12 g | | 11.7 | | | | |
| Diflufenican | 0.16 g | | | 3.0 | | 15 | |
| Bensulfuron methyl + Metsulfuron methyl + Diflufenican | 50 g + 4 g + 0.12 g | 33.77 | 38.3 | | | | |
| Bensulfuron methyl + Metsulfuron methyl + Diflufenican | 50 g + 4 g + 0.16 g | | | 27.25 | 41.7 | 66 | 78.3 |
| Observed-Expected efficacy | | 4.52 | | 14.45 | | 12.3 | |

TABLE 7

| | | % Weed control | | | |
|---|---|---|---|---|---|
| | | GALAP Weed control in Triticum aesti | | GALAP Weed control in Triticum aesti | |
| Dose | | at 16 DAA | | at 16 DAA | |
| Active | Rate Unit | Expected | Actual | Expected | Actual |
| Untreated Check | | | 4.3 | | |
| Bensulfuron methyl + Metsulfuron methyl | 0.08 g | | 66.7 | | 66.7 |
| Diflufenican | 0.05 g | | 13 | | |
| Diflufenican | 0.08 g | | | | 20 |
| Bensulfuron methyl + Metsulfuron methyl + Diflufenican | 0.08 g + 0.05 g | 71.12 | 76.7 | | |
| Bensulfuron methyl + Metsulfuron methyl + Diflufenican | 0.08 g + 0.08 g | | | 73.36 | 81.7 |
| Eo/Ee efficacy | | 5.671 | | 8.34 | |

The results in table 6 and 7 clearly demonstrate synergy between bensulfuron methyl, metsulfuron methyl and carotenoid inhibitor herbicide diflufenican. The combination demonstrated synergy in controlling weeds in general and Galium aparine (Weed code—GALAP) in winter wheat. No phytotoxicity was observed.

Example 5

Field trials were carried out test the synergy of the combination bensulfuron methyl, metsulfuron methyl, and photosystem II inhibitor herbicide metribuzin. The field trials were carried out at various locations in Europe during spring. The percentage efficacy was calculated after 60 days of applications. The target weed were weeds in *Veronica* species (weed code—VERSS) and Galium aparine (Weed code—GALAP) and the results demonstrate the difference between the efficacy of bensulfuron methyl+metsulfuron methyl and the combination of bensulfuron methyl, metsulfuron methyl, metribuzin are recorded in the tables 8 below:

TABLE 8

| | | % Weed control | | |
|---|---|---|---|---|
| | | VERSS Weed control in Triticum aesti at | VERSS Weed control in Triticum aesti at | GALAP Weed control in Triticum aesti at |
| Active | Dose Rate Unit | 16 DAA | 56 DAA | 56 DAA |
| Untreated Check | | 0.00 | 0.00 | 0.00 |
| Bensulfuron methyl + Metsulfuron methyl | 100 g/ha | 56.25 | 81.25 | 81.36 |
| Bensulfuron methyl + Metsulfuron methyl + Metribuzin | 100 g/ha | 61.25 | 92.50 | 86.33 |
| Efficacy over Bensulfuron methyl + Metsulfuron methyl | | 5.00 | 11.25 | 4.97 |

The results clearly demonstrate the combination of bensulfuron methyl, metsulfuron methyl and metribuzin is more efficacious over the double combination of bensulfuron methyl+metsulfuron methyl. The combination was not found to be phytotoxic to crop soft wheat.

Selectivity Studies:

Example 6

Field trials were carried out to test the efficacy of the combination of bensulfuron methyl, metsulfuron methyl against various weeds. The combination of Bensulfuron+Metsulfuron shows absolutely no control on Alopecurus myosuroides (Weed code—ALOMY) (a monocot weed) but demonstrates excellent activity on Matricaria recutita (Weed code—MATCH), *Viola* arvensis (Weed code—VIOAR), Galium aparine (Weed code—GALAP) and Capsella bursa pastoris (Weed code—CAPBP), all of which are dicotyledonous weeds.

TABLE 9

Percentage control on Triticum aestivum at 8 DAA

| Treatment | Dosage | MATCH | ALOMY | VIOAR | GALAP | CAPBP |
|---|---|---|---|---|---|---|
| Bensulfuron methyl + Metsulfuron methyl | 50 g/Ha | 6.3 | 0.0 | 6.3 | 0.0 | 6.3 |
| Bensulfuron methyl + Metsulfuron methyl | 75 g/Ha | 5.0 | 0.0 | 8.8 | 3.8 | 6.3 |
| Bensulfuron methyl + Metsulfuron methyl | 150 g/Ha | 17.5 | 0.0 | 12.5 | 2.5 | 12.5 |

TABLE 10

Percentage control on Triticum aestivum at 14 DAA

| Treatment | Dosage | MATCH | ALOMY | VIOAR | GALAP | CAPBP |
|---|---|---|---|---|---|---|
| Bensulfuron methyl + Metsulfuron methyl | 50 g/Ha | 25.0 | 0.0 | 30.0 | 21.3 | 37.5 |
| Bensulfuron methyl + Metsulfuron methyl | 75 g/Ha | 31.3 | 0.0 | 37.5 | 36.3 | 48.8 |
| Bensulfuron methyl + Metsulfuron methyl | 150 g/Ha | 30.0 | 2.5 | 42.5 | 38.8 | 42.5 |

TABLE 11

Percentage control on Triticum aestivum at 55 DAA

| Treatment | Dosage | MATCH | ALOMY | VIOAR | GALAP | CAPBP |
|---|---|---|---|---|---|---|
| Bensulfuron methyl + Metsulfuron methyl | 50 g/Ha | 97.0 | 0.0 | 97.0 | 97.0 | 97.0 |
| Bensulfuron methyl + Metsulfuron methyl | 75 g/Ha | 97.0 | 0.0 | 97.0 | 97.0 | 97.0 |
| Bensulfuron methyl + Metsulfuron methyl | 150 g/Ha | 97.0 | 0.0 | 97.0 | 97.0 | 97.0 |

Conclusion: Tables 9, 10 and 11 show that the combination bensulfuron+metsulfuron demonstrates excellent control in weeds MATCH, VIOAR, GALAP and CAPBP at an increasing dose-response but surprisingly does not show any activity against ALOMY.

Still more surprisingly, ALOMY was the most dominant weed in the tested plot on 0-day after application. It was surprising that the combination completely failed to control the most dominant weed ALOMY on the tested plot.

| | Weed Population at 0-DAA in plants per square meter | | | | |
|---|---|---|---|---|---|
| Replication | MATCH | ALOMY | VIOAR | GALAP | CAPBP |
| 1 | 8 | 100 | 8 | 4 | 8 |
| 2 | 16 | 100 | 12 | 3 | 8 |
| 3 | 12 | 50 | 12 | 4 | 4 |
| 4 | 12 | 50 | 16 | 2 | 8 |

The combination of bensulfuron+metsulfuron demonstrates excellent activity on Papaver rhoeas, which is a dicotyledonous weed.

| | | Percentage control of Papaver rhoeas on Triticum aestivum | | |
|---|---|---|---|---|
| Treatment | Dosage | 12 DAA | 26 DAA | 61 DAA |
| Bensulfuron methyl + Metsulfuron methyl | 50 g/Ha | 64 | 89 | 93 |
| Bensulfuron methyl + Metsulfuron methyl | 75 g/Ha | 76 | 97 | 99 |
| Bensulfuron methyl + Metsulfuron methyl | 100 g/Ha | 78 | 97 | 100 |
| Bensulfuron methyl + Metsulfuron methyl | 150 g/Ha | 79 | 98 | 100 |

It was concluded that the combination of metsulfuron methyl+bensulfuron methyl demonstrated excellent control over Papaver rhoeas, which is a dicotyledonous weed. It can therefore be concluded that the combination of bensulfuron methyl and metsulfuron methyl can control dicotyledonous weeds whereas the combination with a third herbicide surprisingly controlled monocotyledonous and dicotyledonous weeds. A person skilled in the art would expect comparatively similar distribution of herbicidal activity enhancement by use of this known combination of bensulfuron+metsulfuron for monocotyledonous weeds as well as dicotyledonous weeds. It would have been clearly unexpected and surprising for a person skilled in the art to observe that the combination of bensulfuron+metsulfuron demonstrates a clear distribution of enhanced herbicidal efficacy in favor of control of dicotyledonous weeds vis-à-vis monocotyledonous weeds in a crop field. Still more surprising would have been to observe a broad spectrum of herbicidal efficacy when the combination of bensulfuron+metsulfuron was combined with the third (and fourth) herbicide of the invention. These combinations are themselves new and represent one of the significant contributions of the present invention.

The invention claimed is:

1. A combination comprising bensulfuron methyl, metsulfuron methyl, and a third herbicide selected from the group consisting of:
   (a) Fluroxypyr and its salts or esters;
   (b) 2,4D and its salts or esters;
   (c) MCPA and its salts or esters;
   (d) Diflufenican; and
   (e) Metribuzin;
   wherein the combination of bensulfuron methyl, metsulfuron methyl, and the third herbicide provides a synergistic effect in weed control as compared to an effect in weed control provided by a mixture of bensulfuron methyl and metsulfuron methyl, or by the third herbicide alone.

2. A composition comprising the combination according to claim 1.

3. A method of selectively controlling dicotyledonous weeds infestation at a locus by treating said locus with a herbicidally effective amount of a combination comprising bensulfuron methyl, metsulfuron methyl, and a third herbicide selected from:
   (a) Fluroxypyr and its salts or esters;
   (b) 2,4D and its salts or esters;
   (c) MCPA and its salts or esters;
   (d) Diflufenican; and
   (e) Metribuzin;
   wherein the combination of bensulfuron methyl, metsulfuron methyl, and the third herbicide provides a synergistic effect in weed control as compared to an effect in weed control provided by a mixture of bensulfuron methyl and metsulfuron methyl, or by the third herbicide alone.

4. The kit according to claim 3, comprising instructions for mixing the components prior to spraying.

5. The kit according to claim 3, wherein the bensulfuron methyl, metsulfuron methyl and the third herbicide are packaged separately and tank mixed before spraying.

6. The kit according to claim 3, wherein besulfuron methyl and metsulfuron methyl are packaged separately, and the third herbicide and other additives are packaged separately such that the two are tank mixed at the time of spraying.

7. A kit comprising a herbicidal combination comprising bensulfuron methyl, metsulfuron methyl and a third herbicide selected from the group consisting of:
   (a) Fluroxypyr and its salts or esters;
   (b) 2,4D and its salts or esters;
   (c) MCPA and its salts or esters;
   (d) Diflufenican; and
   (e) Metribuzin;
   wherein the combination of bensulfuron methyl, metsulfuron methyl, and the third herbicide provides a synergistic effect in weed control as compared to an effect in weed control provided by a mixture of bensulfuron methyl and metsulfuron methyl, or by the third herbicide alone.

* * * * *